Dec. 14, 1965 O. FREGEOLLE ET AL 3,222,890

KNITTING METHOD AND APPARATUS

Filed Nov. 10, 1960 9 Sheets-Sheet 1

INVENTOR.
OSCAR FREGEOLLE.
BY FLORIAN C. DUBE.
Rodney C. Southworth
ATTORNEY

KNITTING METHOD AND APPARATUS

Filed Nov. 10, 1960 9 Sheets-Sheet 2

INVENTOR.
OSCAR FREGEOLLE.
FLORIAN C. DUBE.
BY
Rodney C. Southworth
ATTORNEY

KNITTING METHOD AND APPARATUS

Filed Nov. 10, 1960 9 Sheets-Sheet 3

INVENTOR.
OSCAR FREGEOLLE.
FLORIAN C. DUBE.
BY Rodney C. Southworth
ATTORNEY

KNITTING METHOD AND APPARATUS

Filed Nov. 10, 1960 9 Sheets-Sheet 4

INVENTOR.
OSCAR FREGEOLLE.
FLORIAN C. DUBE.
BY Rodney C. Southworth
ATTORNEY

INVENTOR.
OSCAR FREGEOLLE.
FLORIAN C. DUBE.
BY
Rodney C. Southworth
ATTORNEY

KNITTING METHOD AND APPARATUS

Filed Nov. 10, 1960 9 Sheets-Sheet 6

INVENTOR.
OSCAR FREGEOLLE.
BY FLORIAN C. DUBE.
Rodney C. Southworth
ATTORNEY

INVENTOR.
OSCAR FREGEOLLE.
FLORIAN C. DUBE.
BY Rodney C. Southworth
ATTORNEY

KNITTING METHOD AND APPARATUS

Filed Nov. 10, 1960 9 Sheets-Sheet 8

INVENTOR.
OSCAR FREGEOLLE.
FLORIAN C. DUBE.
BY Rodney C. Southworth
ATTORNEY

Dec. 14, 1965 O. FREGEOLLE ETAL 3,222,890

KNITTING METHOD AND APPARATUS

Filed Nov. 10, 1960 9 Sheets-Sheet 9

INVENTOR.
OSCAR FREGEOLLE.
FLORIAN C. DUBE.

BY Rodney C. Southworth

ATTORNEY

United States Patent Office 3,222,890

Patented Dec. 14, 1965

3,222,890
KNITTING METHOD AND APPARATUS

Oscar Fregeolle, Lincoln, and Florian C. Dube, Central Falls, R.I., assignors to Draper Corporation, Hopedale, Mass., a corporation of Maine Filed Nov. 10, 1960, Ser. No. 68,507
14 Claims. (Cl. 66—43)

This invention relates to improvements in knitting, and, particularly, to a method and apparatus for knitting a solid color tubular fabric having clearly defined lines between adjacent pattern areas of contrasting colors, and to the fabric produced thereby.

It is the general object of the invention to provide a method and apparatus for knitting a solid color tubular fabric having an outer face wherein the edges of adjacent pattern areas appear as much as possible as straight lines with no visible projection or intrusion of loops of one pattern area into the fabric of an adjacent area, or, as commonly termed in the knitting art, as "straight edges."

It is a further object to provide a method and apparatus for knitting these "straight edges" in patterned solid color hosiery wherein the edge may extend either in a vertical direction along a single wale or at an angle across a plurality of wales.

It is a further object to provide a novel method for knitting "straight edges" in solid color patterns which may be produced on an existing type of machine without making any major changes thereto.

It is a further object to provide a method for knitting solid color patterned hosiery having "straight edges" between adjacent pattern areas on a multi-feed, independent needle, knitting machine having a reciprocatory needle cylinder.

It is a further object of the invention to simulate and, in fact, to improve upon the edge construction between adjacent, reciprocatorily knitted areas as formed by hand knitting or hand framing hosiery and to accomplish that under production conditions in the fully automatic knitting machine.

Further objects will be apparent from the description which follows.

United States Patent No. 2,217,022 relates to a type of knitting machine with which the present invention is concerned and which is known as the S.C.P. and S.C.O.P. type manufactured by Hemphill Company of Pawtucket, Rhode Island and now by Wildman Jacquard Co. of Norristown, Pennsylvania. The machine has a circular needle cylinder having independent needles therein which may be either rotated or reciprocated past relatively stationary cams, and it is preferably equipped with at least two yarns feeding stations. The angular extent of reciprocation is such that a group of needles may be passed through a cam set twice in a single stroke. A selecting mechanism acts upon needle raising jacks to cause predetermined ones thereof to be raised to place needles into a knitting track or to be affected by narrowing picks which raise, one at a time and in either direction of rotation, certain of the needles to a higher level where their latches are cleared and their knitting function suspended as in the heel and toe.

The patterned parts of hosiery knitted by such a machine may be of practically any desired size, shape, and variety of colors and are usually knitted by reciprocation of the needle cylinder as are the heel and toe. The machine is particularly suitable for knitting Argyle patterns of diamond shaped areas of contrasting colors wherein each diamond may extend for about 180 degrees around the circumference of the article. Many other types of patterns may also be produced such as vertical panels, checker-boards, partial diamonds, and others. Up to the present time, however, it has been difficult to produce solid color patterns of contrasting colors adjoining areas of which were defined by straight, clear lines or edges. One recently proposed method suggests forming an edge by tucking the leading needle in each pattern area. This method, however, does not produce as straight an edge as may be had and further, tuck stitches add to the bulkiness at the edges of pattern areas and the system is carried out only in a very complicated machine.

According to the present invention it is now possible to knit solid color tubular fabric having pattern areas whose junctions define perfectly straight lines heretofore obtainable only by hand knitted methods. There is no longer any intermingling of colors on the face of the fabric where one pattern area meets another. The method may be utilized to equal advantage in patterns having only two differently colored pattern areas in a course as well as in patterns having three, four, or more such areas. The junction between areas furthermore may extend vertically along a single wale or it may extend at an angle crossing a plurality of wales as in the well known Argyle patterns. A description of a pattern having two vertical panels in spaced first and third areas of one color and intermediate second and fourth areas of a second color will be detailed as well as a modification thereof showing the conversion to a pattern including two vertical rows of generally half diamond shaped areas, one on each side of the leg portion of the stocking. A still further pattern comprised of diametrically opposed, walewise extending, pairs of contrastingly colored panels separated by a main body yarn will also be related in detail. These various patterns and an understanding of how they are produced will suffice to enable one skilled in the art to apply the invention to any other pattern since the basic steps involved in making the straight edge will be the same.

Two different ways of forming a straight edge between two areas knitted each with a contrastingly colored yarn have been devised. The first and simplest of the two comprises rotating the needle cylinder in a first direction, knitting a partial course with a first of said yarns in a first of said areas, then crossing a second of said yarns over said first yarn and knitting a partial course with said second yarn in a second of said areas, reversing the direction of rotation of the needle cylinder and knitting a further partial course with said second yarn in said second area, crossing said first yarn over said second yarn, and knitting a further partial course with said first yarn in said first area. These steps are repeated throughout the seam.

Generally, the second method comprises reciprocating the needle cylinder in a first direction, raising a seam needle in a first of the pattern areas to a latch clearing position with picks or any other suitable means at a first yarn feeding station, at that station wrapping a bight of yarn to be knitted in a second area around the shank of the raised needle and knitting that yarn in the second area and at the first feeding station, then knitting in the first area at a second feeding station, the previously raised needle being lowered now to knit with other needles in that first area, its yarn being drawn through both the wrapped bight of second area yarn and a previously drawn stitch of first area yarn.

Where there are four separate areas in a given course or courses, then while the cylinder is still reciprocating in the same direction, a similar needle is raised in the third area and at the first feeding station. Then, a bight of yarn to be knitted in the fourth area is wrapped around this newly raised needle at the first station and that yarn is knitted in the fourth area at that station. Finally, knitting takes place in the third area at the second feeding station, the newly raised needle being lowered to knit at this time and to draw a stitch through both the wrapped bight of fourth area yarn and a previously drawn third area stitch.

The direction of reciprocation of the needle cylinder is then reversed and the steps are repeated with respect to the third seam. At the fourth seam no needle need be raised since a straight edge will be formed, automatically by the first method above described due to the crossing over of yarns at that seam.

This sequence is then repeated as long as desired depending upon the extent of the pattern. Where the pattern requires vertical edges between adjacent areas, then the needle to be raised to a latch clearing position is always the same one for any given edge as subsequent courses are knitted. In those patterns where the edge extends on an angle to the wales, then the needle to be raised will continually vary depending upon the steepness of the angle. In any event the raised needle is always the last needle to knit in its area at a feeding station other than that at which it was raised.

According to the apparatus of United States Patent No. 2,217,022, the narrowing or needle raising picks of such a machine are active only in the heel and toe as determined by a primary control disc located on the main pattern drum. In order to provide for actuation of the picks between active and inactive positions during each reciprocation of the needle cylinder as required by the novel method, a secondary control means has been devised for that purpose. Also, movable cams have been provided for effecting lowering of the raised needles so that they may knit at the next feeding station.

A more complete understanding of the invention will be had by reference to the following more detailed description and drawings, wherein:

FIGS. 1 and 2 illustrate, respectively, stockings having patterns including edges formed at angles to the wales and one wherein the edges extend vertically along a single wale and are produced in accordance with the present invention;

FIGS. 1*a* and 2*a* are views of fabrics to a much enlarged scale taken at the back side of the areas enclosed in dotted lines in FIGS. 1 and 2, respectively.

FIGS. 1*b* and 2*b* are similar views of the diametrically opposed portions of each stocking;

FIGS. 15 and 16 are similar views illustrating a complete course of knitting in the opposite direction;

Figure 17:
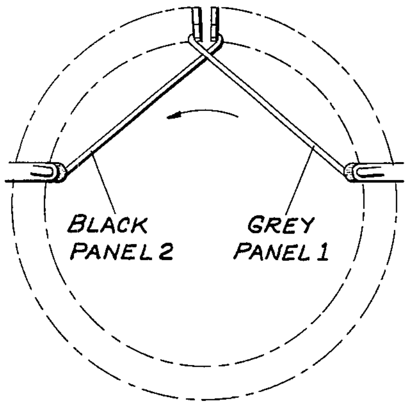
Figure 18:
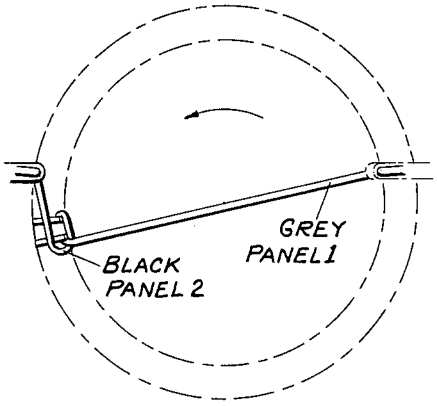
Figures 19, 20, 21:
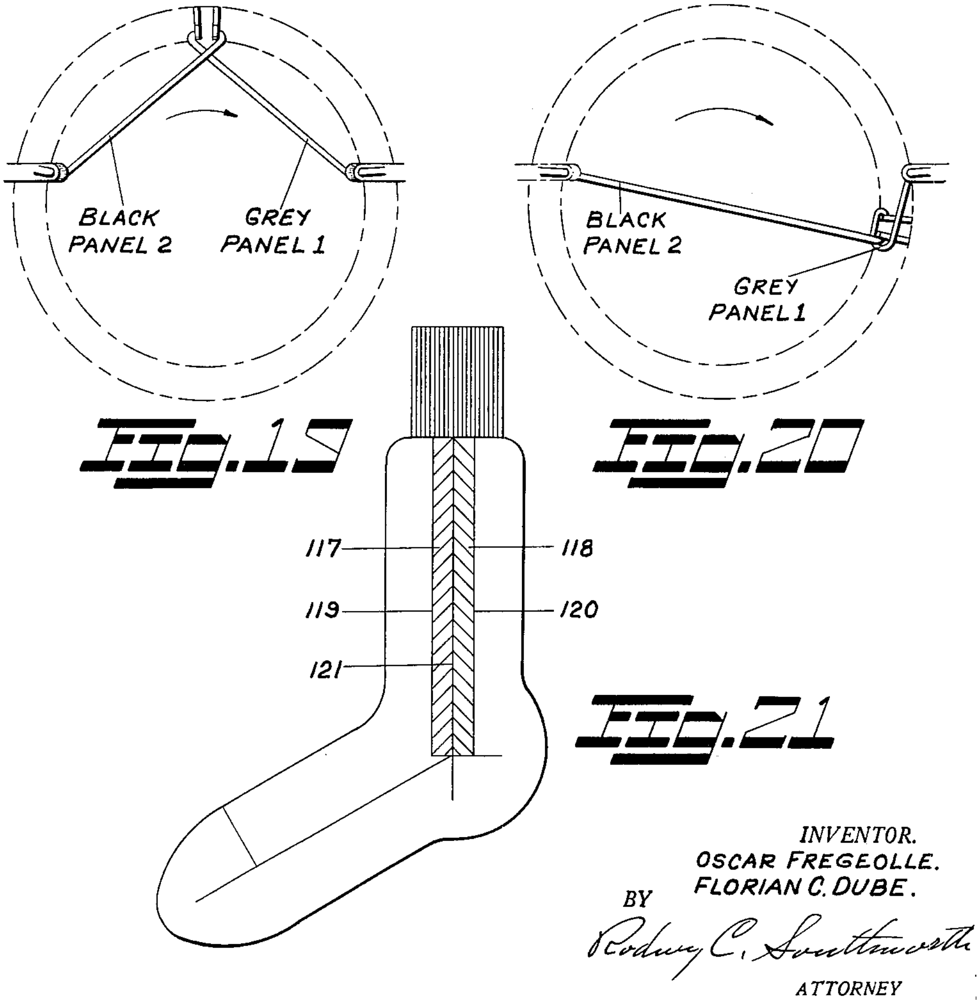

FIGS. 17 and 18 indicate how two yarns cross to form a seam and in one direction of rotation of the needle cylinder according to one method of the invention;

FIGS. 19 and 20 are similar views of the yarn crossing in the reverse direction of rotation; and FIG. 21 illustrates a stocking wherein a pair of vertical panels are knitted adjacent each other, the seam in-between the two being formed by crossing yarns while the outer seams may be formed by the raised needle method.

Figure 15:
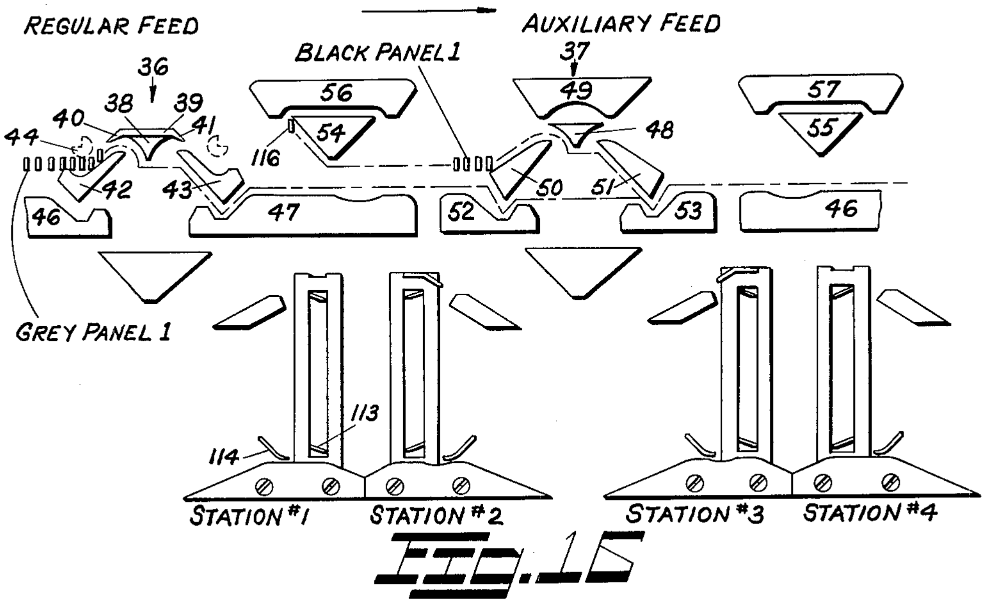
Figures 1, 2:
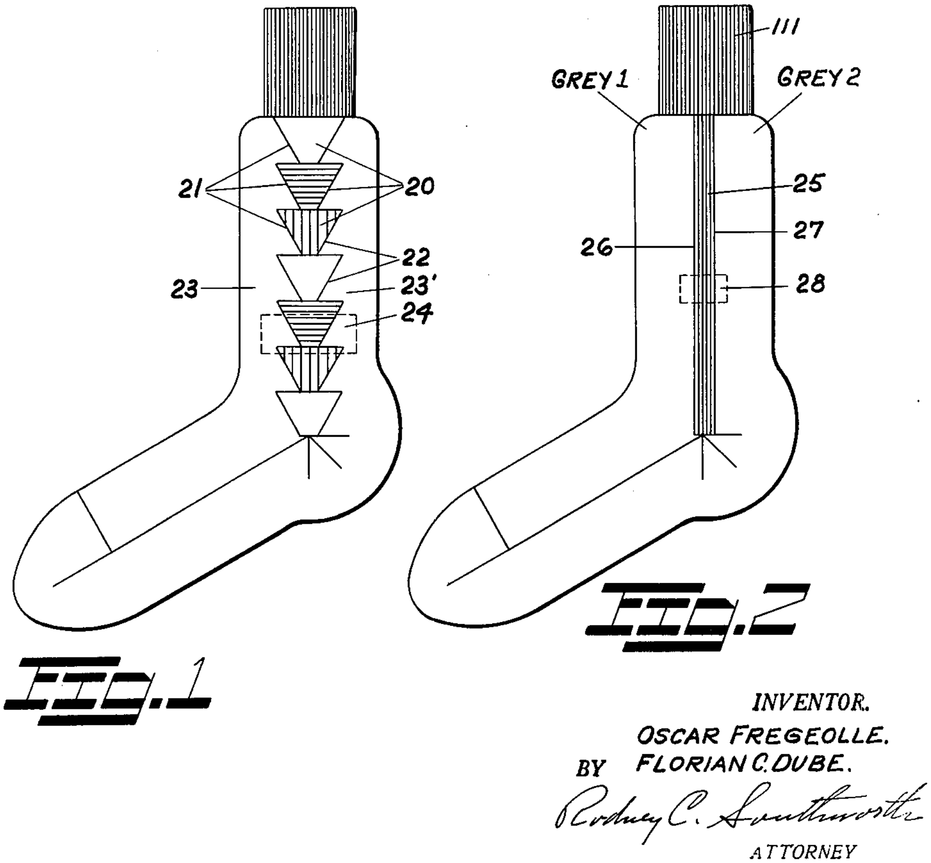
Figures 1B, 2B:
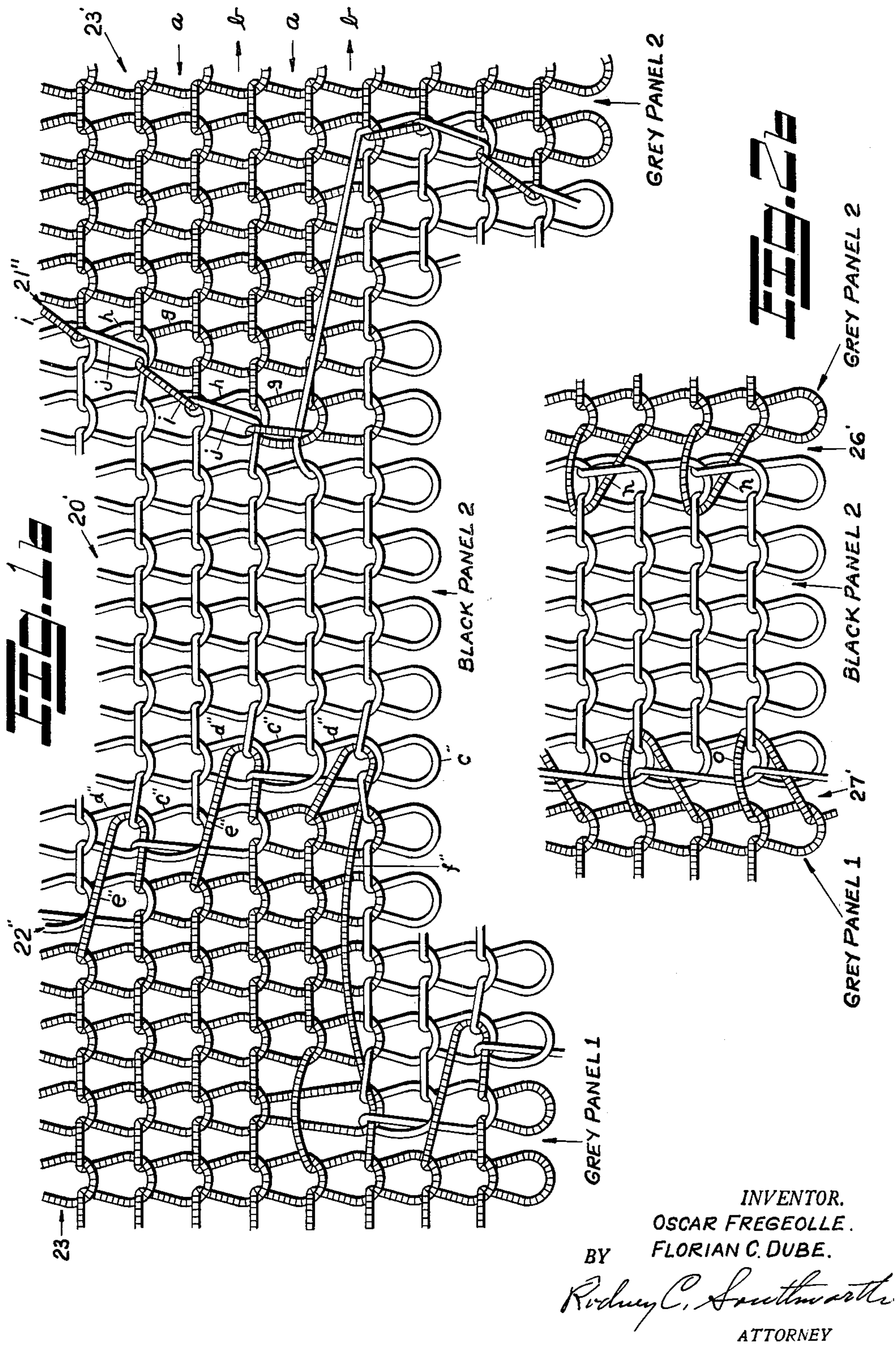
Figures 3, 4, 5:
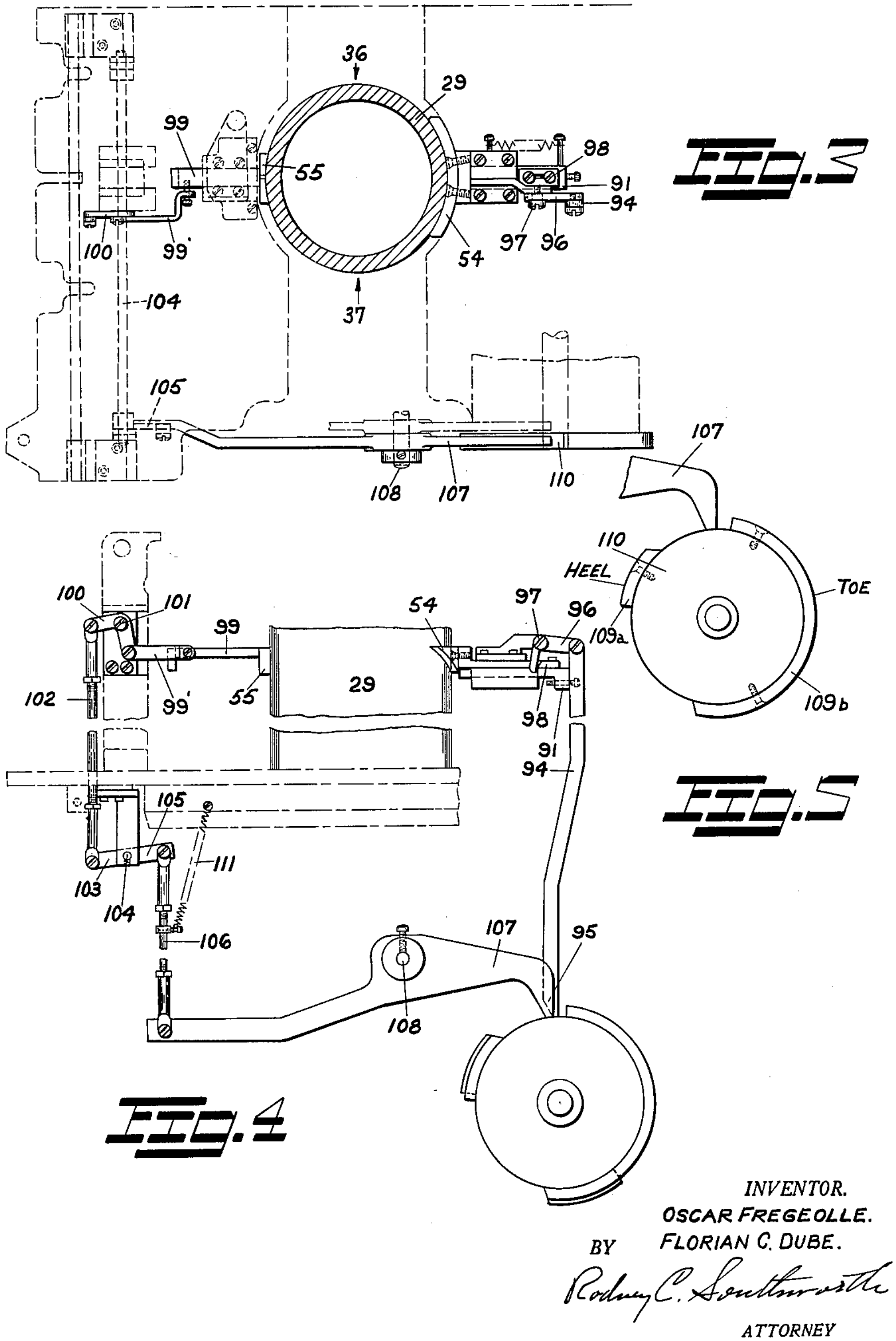
FIG. 4 is a side elevation of the structure of FIG. 3.
FIG. 5 is a side elevation of the control disc for the needle lowering cam.
Figures 6, 7:
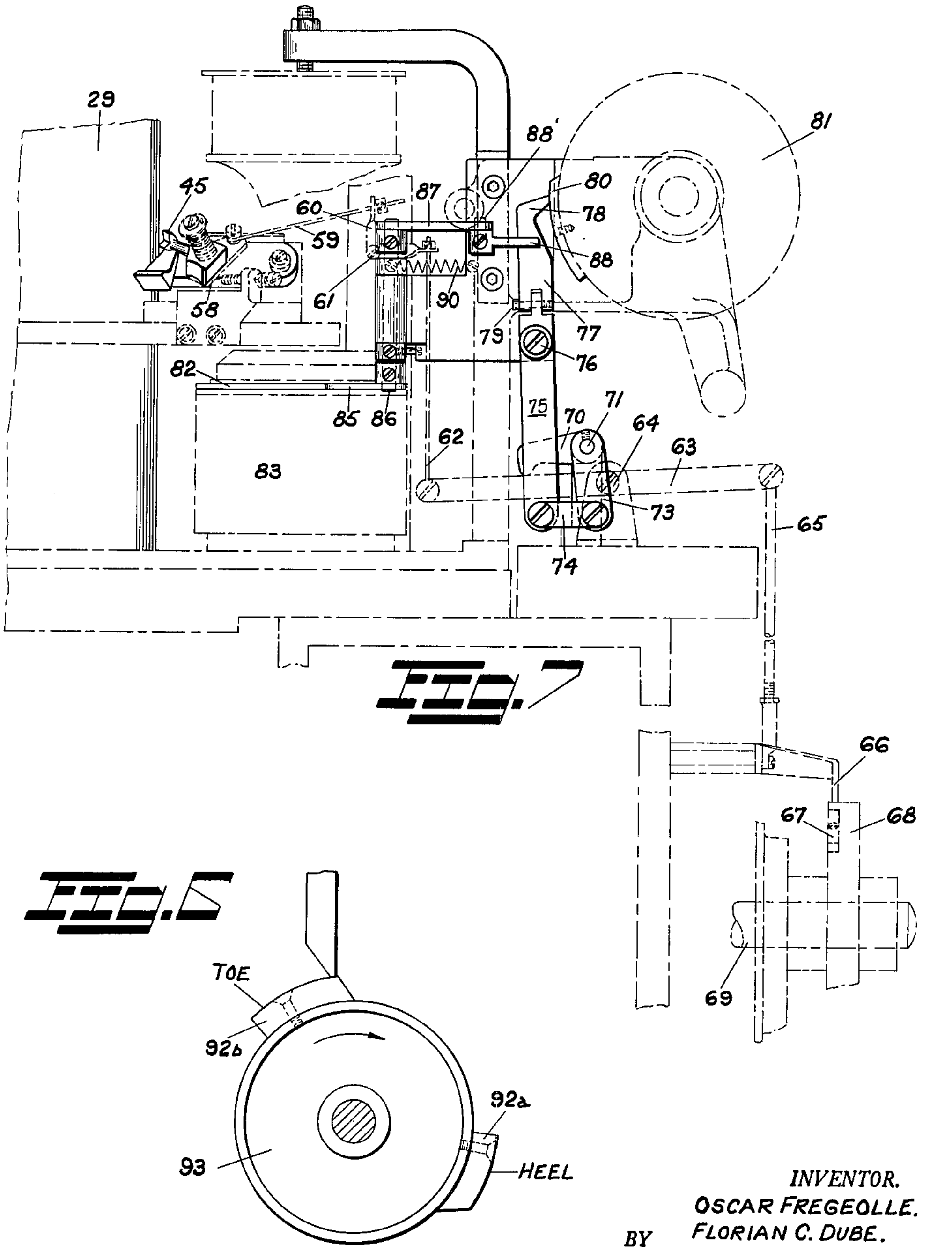
FIG. 6 is a side elevation of the control disc for the front needle lowering cam.
FIG. 7 is a front elevation of a portion of the knitting machine illustrating the narrowing pick control mechanism.

In the drawings, FIG. 1 illustrates a stocking opposite sides of the leg portion of which each include a vertical row of generally triangular shaped solid color areas 20, two sides or edges 21 and 22 of which extend at an angle to the wales in the fabric. Those areas may all be of the same or of separate colors and the plain areas 23, 23' may be of a still different color. The back side of the area 24 enclosed in dotted lines is illustrated on a much enlarged scale in FIG. 1*a* in order to show the actual interlocking between the yarn in the plain areas 23, 23' and that in the pattern area 20. It may be seen that the overlapping of colors is visible only on the back side of the fabric, remembering that the loops will actually be closed much more than shown. In FIGS. 1*a* and 1*b* the unshaded yarn in areas 20 and 20' may be assumed to be knitted with black yarn and those areas will be referred to in the specification and claims as the first and third areas, respectively. The shaded yarn in areas 23 and 23' may be assumed to be knitted with grey yarn and those areas will be referred to as the second and fourth areas, respectively. The courses "*a*" are knitted in a counterclockwise direction, while those marked "*b*" are knitted in the opposite direction. Further, the grey yarn is knitted at one feeding station while the black yarn is knitted at a second feeding station. In the particular pattern illustrated, narrowing takes place at every second course in the black areas 20, 20', although this is entirely optional. The seam 21 in FIG. 1*a* may be seen as comprised in part of single black loops or stitches "*c*" appearing in the alternate "*a*" courses and which are drawn through previously drawn single black loops or stitches "*d*" in the "*b*" courses and also through laterally extending bights "*e*" of grey yarn which appear as floats on the back side of the fabric. The lowermost course marked "*a*" in FIG. 1*a* represents the beginning of a new pattern area 20 and for that reason a long black float "*f*" appears on the back side of the fabric. The seam 22 is similar in appearance to seam 21 and the corresponding loops and bights of yarn have therefore been indicated by similar letters in primes.

FIG. 1*b* illustrates the panel 20' on the opposite side of the stocking shown in FIG. 1. The seam 22'' at the left-hand side of that panel is similar to the seam 22 and accordingly, the parts thereof have been designated with similar reference letters in double primes.

The seam 21'' at the right side of FIG. 1*b* is substantially different from either of the other three, it being formed merely by crossing over of yarns as mentioned above as the first method of forming a straight edge and as later to be explained in more detail. That seam is comprised of single stitches "*g*" of grey yarn drawn through single stitches "*h*" of black yarn and floats "*i*" of grey yarn extending across alternate courses and further interlink or twist about floats "*j*" interconnected therewith and extending across the intermediate courses.

In FIG. 2 a stocking is shown as having a vertical solid color panel 25 extending along the leg portion thereof, a similar panel (not shown) extending along the opposite side. The panel 25 has edges or seams 26 and 27 extending in a vertical direction. The area 28 enclosed in dotted lines in FIG. 2 is shown on a much enlarged scale in FIG. 2*a* and a similar area on the opposite side of the stocking is shown in FIG. 2*b* including the seams 26' and 27'. It is to be especially noted that in all four of the seams, no stitches of one area are drawn through stitches of the adjacent area, the interconnection of adjacent areas being entirely by laterally extending bights of yarn of one of the areas tied in with stitches of the adjacent area. In seam 26, for example, the only joining between the shaded and unshaded yarns is by means of the laterally extending bights "*k*" of the shaded yarn tied in with the first wale of unshaded yarn in area 25. That seam is formed in a manner similar to seam 21″ of FIG. 1*b* by merely crossing of yarns as will later be explained in complete detail. In the seam 27 the only tying in of yarns is by means of the laterally extending bights "*m*" of the shaded yarn. Similarly, in the seam 26′ the only tying in of yarns is by means of the laterally extending bights "*n*" and in the seam 27′, by bights "*o*."

Figure 12:
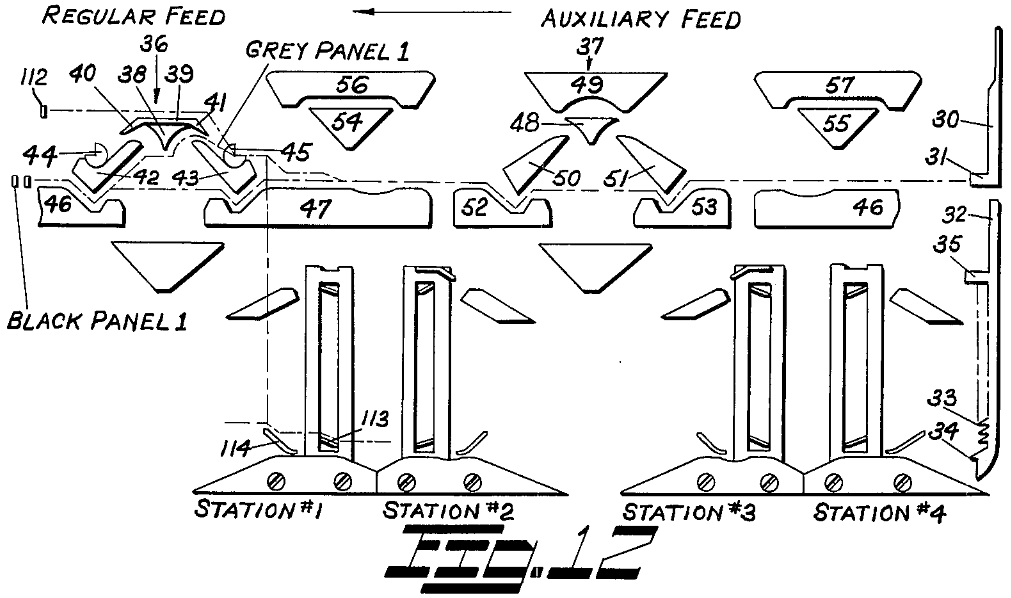
FIGS. 12 to 14 are diagrammatic views of needle and jack cams with butt pathways, illustrating a course of knitting with the needle cylinder moving in a counterclockwise direction.

A knitting machine particularly adapted to carry out the present invention is the well-known Banner S.C.O.P. manufactured by the Wildman Jacquard Co. and which is fully described in United States Patent No. 2,217,022 and later patents. Portions of that machine pertinent to the present invention along with modifications thereof to permit additional control of the narrowing picks necessary to produce the straight edge have been illustrated in FIGS. 3 to 11. A needle cylinder 29 may be either rotated or reciprocated in known manner and includes needles 30 preferably of the latch type with butts 31 divided into two groups of long and short butts. Each needle has a selecting jack 32 beneath it, each jack having selecting butts 33 capable of being selectively broken off to set up a pattern, a master butt 34 and a plain sole butt 35 (FIG. 12).

Figures 2, 3:
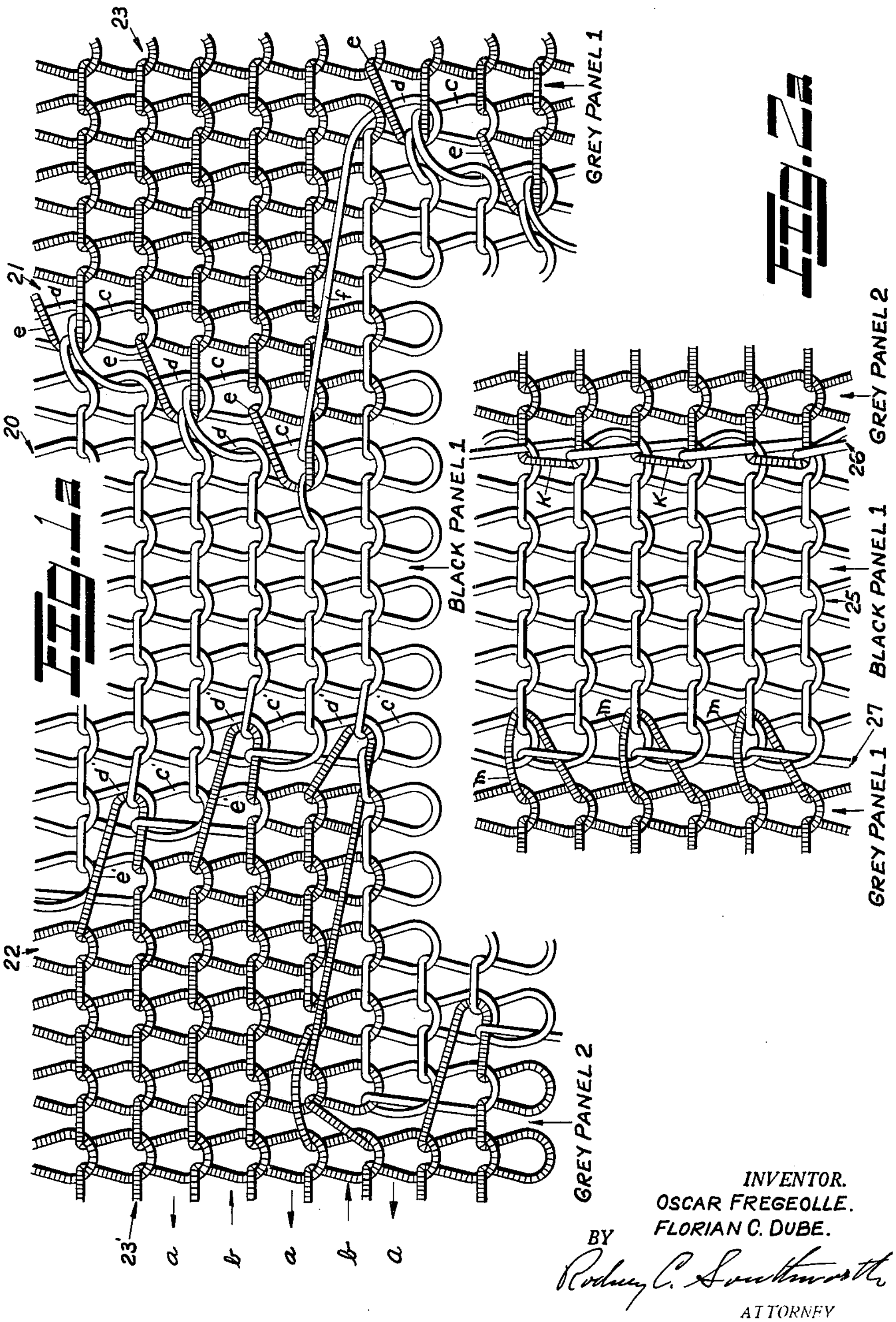
FIG. 3 is a plan view of the needle cylinder including front and rear needle lowering cams and controls therefor.

There are two knitting and feeding stations in this particular machine, although there may be more. A regular or main feeding station 36 is located at the right-hand side of the machine and an auxiliary station 37 at the left-hand side thereof (FIG. 3). The regular station includes, as shown in FIG. 12, a center cam 38, a wing cam 39 mounted thereon which includes downwardly angled ends 40 and 41 to assist in raising short butt needles above cam 39 in a manner later to be explained, and a pair of stitch cams 42 and 43. The latter include, respectively, recesses for the reception of narrowing picks 44 and 45 when the picks are moved to their active or needle raising position. Needle raise cams 46 and 47 complete the group at the main station.

The auxiliary feeding station includes a center cam 48, guard cam 49, stitch cams 50 and 51, and raise cams 52 and 53. Widening picks (not shown) function adjacent each of these stitch cams. A front needle lowering cam 54 and a rear needle lowering cam 55 are radially movable toward and away from the needle cylinder by cam controlled link members. Guard cams 56 and 57 function with the needle lowering cams to assure that needle butts follow their intended pathway.

Both of the narrowing picks 44 and 45 are movable simultaneously between active and inactive positions by a common linkage system. As noted in FIG. 7 where the pick 45 only is shown, the latter is mounted on a pivotable base 58 having a lip 58′ engaging the pick and connected by a link member 59 to one arm of a bell crank lever 60 pivoted at 61. The other arm of lever 60 is attached to a further link 62 which itself connects with a horizontal lever 63 pivoted at 64 intermediate its ends. The opposite end of that lever is pivoted to a vertical rod 65 having a follower 66 fixed to its lower end and engageable with one of a number of cams 67 spaced around the circumference of a primary control disc 68 mounted on the main pattern shaft 69. According to conventional practice the narrowing picks are held out of action by cams 67 except when knitting in the heel and toe.

Figures 8, 9, 10, 11:
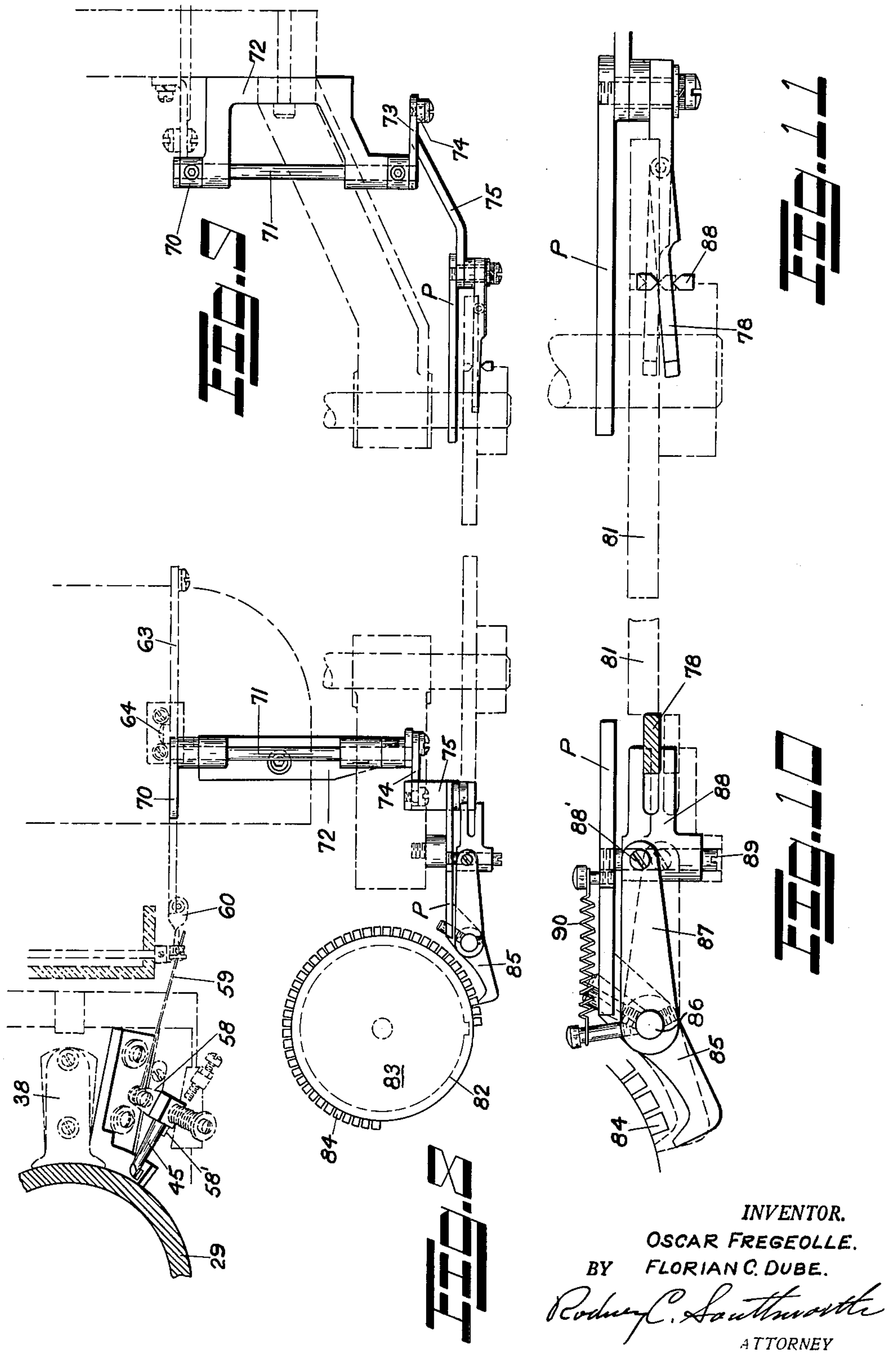
FIG. 8 is a plan view of FIG. 7.
FIG. 9 is an end view of FIG. 7.
FIG. 10 illustrates a portion of FIG. 8 on enlarged scale.
FIG. 11 illustrates a corresponding portion of FIG. 9 on enlarged scale.

In order to increase the selectivity of the narrowing picks whereby they may be actuated between active and inactive positions on repeated reciprocations of the needle cylinder as is required in order to practice the present novel method of making a straight edge, a secondary control means has been provided to supplement the primary control means. That mechanism comprises a depressor member 70 mounted immediately above one arm of lever 63 to act on the latter to cause the pick to be moved to an inactive position, or that position illustrated in FIGS. 7 and 8. The depressor is fixed to one end of a short stud 71 rotatably supported in a bracket 72 (FIG. 9). To the opposite end of the stud is fixed an arm 73 which is pivotally connected to a further link 74 which in turn is pivoted to a vertically extending actuating arm 75. The latter is pivoted at 76 and has its upper end reduced to be received in the bifurcated end 77 of a follower 78 which is a swingable forwardly and rearwardly about a pin 79 out of and into the path of a cam 80 fixed to the circumference of a rotatable disc 81. Movement of the follower into and out of the cam path is selectively controllable from a disc 82 on the pattern drum 83, the disc having butts 84 around the periphery thereof which butts may be broken off at will to set up a predetermined pattern. A follower arm 85 is fixed to the lower end of an oscillatable rod 86 supported in a vertical plate P and is adapted to receive indications from the disc periphery thereby to be moved between the solid and dotted line positions in FIG. 10. To the upper end of the rod is fixed a horizontally extending arm 87 which at its outer end is linked to a bifurcated slider 88 by means of a pin 88′ which is movable along a pin 89 as dictated by the arm 87. A spring 90 (FIG. 7) acts upon a pin fixed to the back of the rod 86 to keep the follower 85 in against the outer surface of the disc 82.

From the above description it may now be evident that when the follower 85 is in the solid line position of FIG. 10 or in contact with butts 84, the follower 78 will be in position to be affected by the disc 81, thereby to move the picks 44 and 45 to an inactive position as the cam 80 comes in contact with the follower 78 and to allow the picks to return to an active position when the two are out of contact. This cycle take place on each revolution of the disc 81 during patterning and thus on alternate reciprocations of the needle cylinder since the disc rotates a half revolution for each complete oscillation of the cylinder. The function of the cam 80 is to render the picks inactive at that time when the fourth seam is being formed by crossing over of yarns without raising a needle to a latch clearing position. During patterning the follower 66 must be down on the drum 68 in order to permit the picks to be moved between active and inactive positions by means of the cam 80 and its associated mechanism.

Now referring to FIGS. 3 to 6 the mechanism for controlling movement of the front and rear draw down cams 54 and 55 will be described. The front cam 54 is fixed to the end of a horizontal stem 91. The cam is urged inwardly against the cylinder by a spring (not shown) and is drawn out by one of a row of cams **92*a*, 92*b*, on a drum 93 acting on a bar 94 having a toe 95. The bar acts through a bell crank lever 96 pivoted at 97 and having one arm connected to the bar and the other engageable behind a laterally extending follower 98 adjustably fixed to the cam stem 91**.

The rear draw down cam 55 is separately controllable and is fixed to the end of a stem 99 movable toward and away from the cylinder and connected to a linking member 99′ which further is connected to one arm of a bell crank lever 100 pivoted at 101. A linking rod 102 has one end connected to the other arm of that lever and its other end to the free end of an outwardly extending arm 103 whose other end is fixed to an oscillatable shaft 104. Attached to the latter at the outer end thereof is a further arm 105 pivotally connected to a further rod 106 which is further linked to a follower arm 107 pivoted at 108 and adapted to be influenced by one of the cams **109*a*, 109*b*, attached to the periphery of a disc 110. A spring 111 urges the cam 55 inwardly against the cylinder while one of the cams 109*a***, or *b* acting through the follower 107 and linking members move that cam out from the cylinder at the proper times.

The manner in which a panel pattern such as that shown in FIG. 1 is knitted wherein such a panel appears on opposite sides of the leg portion of a stocking will now be described. Let it first be assumed that the two narrow vertical panels will be knitted with black yarn and the area therebetween with grey yarn. In FIG. 1*a* starting with the black panel seen therein and going from left to right, the various leg portions will be referred to as the first, second, third and fourth areas, or as Black Panel I, Grey Panel I, Black Panel II and Grey Panel II, respectively. At the completion of the top or rib portion 111, it will further be assumed that the first course to be knitted in the leg portion will take place with the cylinder moving in a counterclockwise direction so that needles are moving from right to left in the direction of the arrow in FIG. 12. At the main or regular feed the needle 112 in Black Panel I at the extreme left of that panel as seen in FIG. 1 and which is immediately adjacent Grey Panel I is raised with its group by means of jacks selected by a plunger 113 at selecting station #1 in the usual manner as set forth in United States Patent No. 2,217,022, the jack then being raised further as the master cam 114 acts upon that jack's master butt 34. The needle 112 is accordingly raised to be affected by stitch cam 43 and then to be raised to a latch clearing position over the top of wing cam 39 by the narrowing pick 45 which is now in its active position. At this time, also, the yarn finger (not shown) for feedng grey yarn to Grey Panel I is in its feeding position at the main feeding station thereby to cause that grey yarn to be wrapped around the shank of needle 112. At the same time all the remaining needles selected for Grey Panel I knit at the main feeding station, all of the needles in Black Panel I except needle 112 which has actually been picked out of one panel into another having passed inactively under the main cam block.

Figure 13:
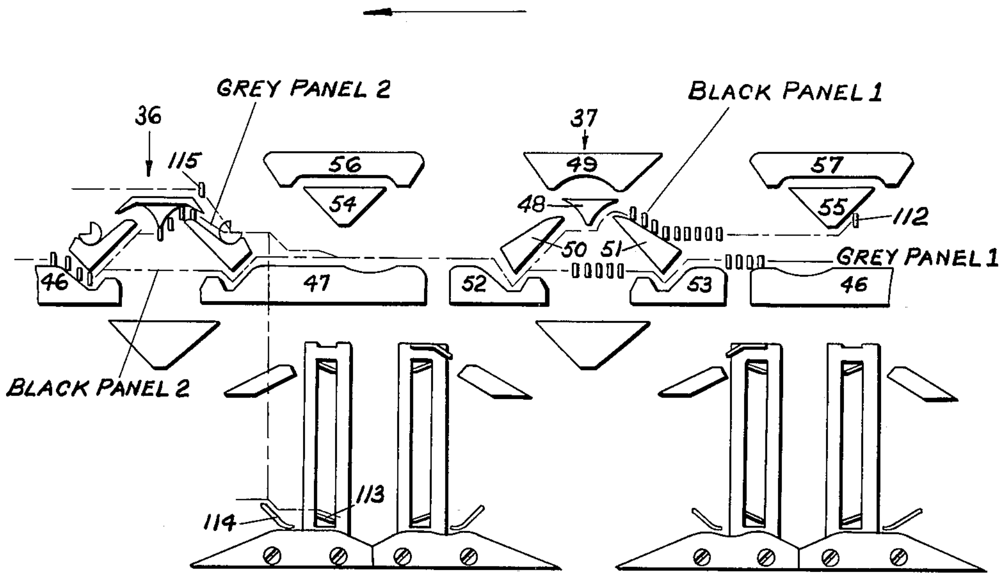

Now referring to FIG. 13, as the cylinder rotates further in the same direction, the needle 112 is caused to be lowered by cam 55 into the knitting track and to knit at the auxiliary feeding station together with the remainder of the needles in Black Panel I which have been selected at station #3, grey needles on both sides of that panel passing inactively through that station. Then, at the main feeding station, the needle 115 in Black Panel II which is immediately adjacent Grey Panel II is selected at station #1 and is raised by pick 45 to a latch clearing position over the top of cam 39, the remainder of the needles in Black Panel II having passed inactively under the main cam block and the needles in Grey Panel II being selected to knit at this time, that yarn first being wrapped around the shank of needle 115.

Figure 14:
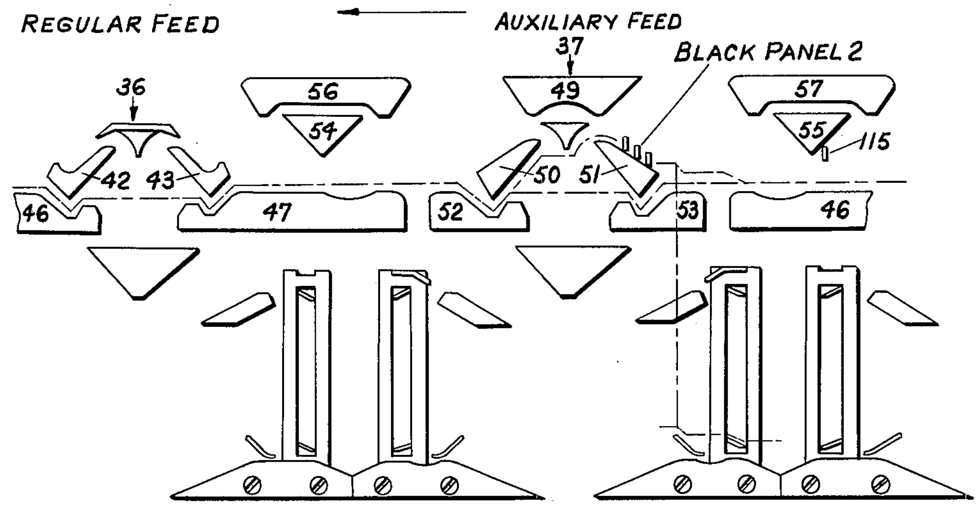
Figure 15:
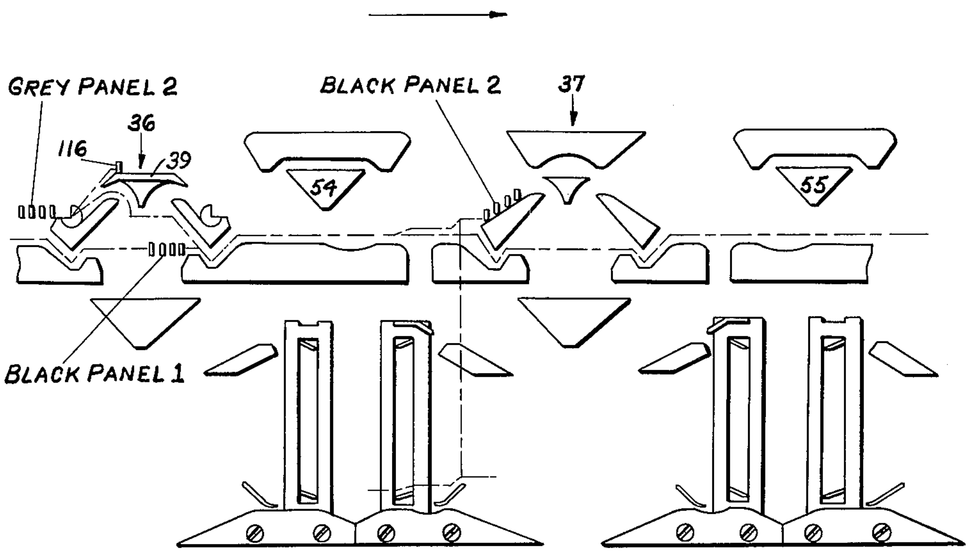

In FIG. 14 the completion of a course of knitting with the cylinder moving in a counterclockwise direction is shown. The needle 115 is lowered by the cam 55, and at this time the Black Panel II yarn crosses over the Grey Panel I yarn to form the fourth seam automatically without raising to extra height any needles at this seam as shown diagrammatically in FIGS. 17 and 18. All of the Black Panel II needles now knit at the auxiliary feed.

Now as the direction of the needle cylinder is reversed to clockwise, a needle 116 in Black Panel I immediately adjacent Grey Panel II is selected at station #4 and raised by pick 44 over the top of cam 39 at the main feeding station, the remainder of the Black Panel I needles passing inactively through that station while the Grey Panel II needles knit after having been wrapped around the shank of needle 116. At the auxiliary feeding station all Black Panel II needles are selected to knit.

As the cylinder rotates further in the same direction, the pick 44 is raised to an inactive position by the secondary control means and cam 80 preparatory to the formation of the fourth seam. Grey Panel I yarn then crosses over the Black Panel II yarn to form a further course in that seam as illustrated in FIGS. 19 and 20 and all the Grey Panel I needles, having been selected at station #4, knit at the main feed while Black Panel II needles pass inactively therethrough. Previously raised needle 116 is lowered by means of cam 54 and knits with the remaining Black Panel I needles at the auxiliary feed, thereby completing the second course of knitting.

This reciprocation and selection of needles are repeated until the patterning has been completed. It is to be noted that in the particular pattern described above containing four seams, three of the seams are formed by raising the last needle later to knit in one of the panels and wrapping a bight of yarn of an adjacent panel around that needle prior to the time that needle knits in the first mentioned panel. The fourth seam is formed merely by crossing of yarns of adjacent panels over each other, a first yarn crossing over the second in one direction of rotation of the needle cylinder and then the second crossing over the first prior to knitting in the opposite direction of rotation. Whichever type of seam is being formed, at no time does any needle draw more than a single loop or stitch at a time or through more than a single previously drawn stitch. The needles raised to a latch clearing position at three of the seams draw their stitches through a single previously drawn stitch only and through the wrapped bight of yarn but since that bight was never in the hook of the needle, it merely appears as a laterally extended connecting yarn to tie in one of the pattern areas with that adjacent. It is in a sense, treated as an inlaid yarn would be but since the course direction reverses at that point, it merely casts off as a laterally extending bight. There being no time at which there are two loops in a needle hook at once there can be no walewise accumulation of loops, thus no tuck stitches are formed. No added bulk is forthcoming.

To knit a pattern as shown in FIG. 2 the same procedure as outlined above is used except that in successive courses, the needle to be raised is always the same needle. In the pattern of FIGS. 1 and 1*a* the panel is narrowed on alternate courses only.

The two patterns of FIGS. 1 and 2 have been illustrated and described as each including four seams, three of which are formed by one method according to the invention and the fourth by a second method which includes crossing over of yarns. It is to be understood, however, that such a combination has been chosen merely for illustrative purposes and that the invention is not limited thereto. As an alternative two of the edges could have been formed by one method and the other two by the second method. Of course, if one so desired, only a single panel need be knitted one each of the seams of which may be formed by each of the methods, or both seams by either of the methods.

As a further illustration of a pattern of the type in the production of which the invention has particularly useful application, FIG. 21 shows a stocking having a pair of adjacent vertical panels 117 and 118 which are preferably of contrasting colors and a similar pair (not shown) on the opposite side thereof. The two outer seams 119 and 120 may be formed by the raised needle method while the seam 121 may be formed by the crossed yarn method and the seams on the other side may be similarly formed, all with the apparatus and according to the general method herein disclosed.

While one embodiment and modifications of the invention have been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

We claim:

1. A method of knittting a solid color tubular fabric having first and second adjacent areas of first and second yarns, respectively, on a circular, independent needle, knitting machine having a needle cylinder, needles and at least a first and a second knitting stations which comprises the steps of raising to a latch clearing position at said first feeding station a needle at one of the junctions of said areas, wrapping a bight of said second yarn around the shank of said raised needle, knitting said second yarn in said second area at said first feeding station, and knitting said first yarn in said first area at said second feeding station and during one and the same stroke of the needle cylinder as that of the previous step, said raised needle now drawing a stitch of said first yarn through both said wrapped bight and a previously drawn stitch of said first yarn and being the last needle to knit at said one junction.

2. A method of knitting a straight edge in a solid color tubular fabric having at least four separate pattern areas in some at least of the courses thereof on a circular, independent needle, knitting machine having a needle cylinder, needles, and at least two feeding stations which comprises the following steps, all of which take place during one and the same stroke of the needle cylinder, raising to a latch clearing position a needle in a first of said areas, wrapping a bight of yarn to be knitted in a second of said areas around the shank of said needle, knitting said yarn in said second area at a first of said feeding stations, knitting in said first area at a second of said feeding stations, said raised needle being the last to knit at the junction of said first and second areas, raising to a latch clearing position a further needle in a third of said areas, wrapping a bight of yarn to be knitted in a fourth of said areas around the shank of said latter needle, knitting in said fourth area, and then knitting in said third area, said further needle being the last to knit at the junction of said third and fourth areas.

3. The method of claim 2 wherein said fourth area is knitted at said first feeding station, and said third area is knitted at said second feeding station.

4. A method of knitting a straight edge in a solid color tubular fabric having at least four separate pattern areas in some at least of the courses thereof on a circular, independent needle, knitting machine having a needle cylinder, needles, and at least two feeding stations which comprises the steps of rotating said cylinder in a first direction, raising to a latch clearing position a needle in a first of said areas, wrapping a bight of yarn to be knitted in a second of said areas around the shank of said needle, knitting said yarn in said second area at a first of said feeding stations, knitting in said first area at a second of said feeding stations, said raised needle being the last to knit at the junction of said first and second areas, raising to a latch clearing position a further needle in a third of said areas, wrapping a bight of yarn to be knitted in a fourth of said areas, around the shank of said latter needle, knitting in said fourth area, knitting in said third area, said further needle being the last to knit at the junction of said third and fourth areas, reversing the direction of rotation of said needle cylinder, raising to a latch clearing position a still further needle in said first area, wrapping a bight of yarn to be knitted in said fourth area around the shank of said further needle, knitting in said fourth area, knitting in said third area, and then knitting in said second and first areas.

5. The method of claim 4 wherein said second and fourth areas are knitted at said first feeding station and said first and third areas are knitted at said second feeding station.

6. The method of claim 4 wherein each of said raised needles is in a position immediately adjacent that area whose yarn is wrapped around that needle, and wherein each of said raised needles is lowered to knit last with the remaining needles in its respective area.

7. The method of claim 4 wherein said straight edge is formed along a single wale.

8. The method of claim 4 wherein said straight edge intersects several wales.

9. A method of knitting a straight edge in a solid color tubular fabric having at least four separate pattern areas in some at least of the courses thereof on a circular, independent needle, knitting machine having a needle cylinder, needles, and at least two feeding stations which comprises the steps of rotating said cylinder in a first direction, raising to a latch clearing position a needle in a first of said areas, wrapping a bight of yarn to be knitted in a second of said areas around the shank of said needle, knitting said yarn in said second area at a first of said feeding stations, knitting in said first area at a second of said feeding stations, said raised needle being the last to knit at the junction of said first and second areas, raising to a latch clearing position a needle in a third of said areas, wrapping a bight of yarn to be knitted in a fourth of said areas around the shank of said latter needle, knitting in said fourth area, lowering said last raised needle and knitting therewith and with adjacent needles in said third area.

10. In a circular, independent needle, knitting machine, a reciprocable needle cylinder and needles slidable therein, two feeding stations spaced around said cylinder, narrowing picks adjacent one at least of said stations, primary control means for selectively actuating said picks at certain spaced intervals, and secondary control means independent of said primary control means for selectively actuating said picks at intermediate intervals.

11. The apparatus of claim 10 which includes movable cam means intermediate said two feeding stations effective to lower raised needles into a knitting track.

12. A method of knitting a seam joining two adjacent areas formed of contrastingly colored yarns, one said yarn only being knitted in each area, which comprises the steps of knitting a partial course with a first of said yarns in a first of said areas, then crossing a second of said yarns over said first yarn at said seam and knitting a partial course with said second yarn in a second of said areas, reversing the direction of knitting and knitting a further partial course with said second yarn in said second area, crossing said first yarn over said second yarn at said seam, and knitting a further partial course with said first yarn in said first area.

13. In a circular, independent needle, knitting machine, a reciprocable needle cylinder and needles slidable therein, a first and a second yarn feeding station, means adjacent said first station effective to raise needles to a latch clearing position whereby a yarn may be wrapped around the shanks of said raised needles in either direction of reciprocation of said cylinder, selectively operable cam means intermediate said first and second stations for lowering said raised needles into a knitting track whereby they may knit at said second station, said first-mentioned means comprising narrowing picks movable between active and inactive positions, primary control means for actuating movement of said picks between said positions at predetermined intervals, and second secondary control means therefor for actuating movement thereof intermediate said intervals.

14. In a circular, independent needle, knitting machine, a reciprocable needle cylinder and needles slidable therein, a first and a second yarn feeding station, means adjacent said first station effective to raise needles to a latch clearing position whereby a yarn may be wrapped around the shanks of said raised needles in either direction of reciprocation of said cylinder, selectively operable cam means intermediate said first and second stations for lowering said raised needles into a knitting track whereby they may knit at said second station, said first-mentioned means comprising narrowing picks movable between active and inactive positions, and control means for actuating movement of said picks between said positions during each reciprocation of said cylinder.

References Cited by the Examiner

UNITED STATES PATENTS

| | | | |
|---|---|---|---|
| 617,040 | 1/1899 | Nelson | 66—179 X |
| 1,087,545 | 2/1914 | Nelson | 66—179 X |
| 1,428,332 | 9/1922 | Jones | 66—48 X |
| 2,123,284 | 7/1938 | Lawson et al. | 66—48 |
| 2,179,336 | 11/1939 | Lawson | 66—179 |
| 2,217,022 | 10/1940 | Lawson et al. | 66—43 |

(Other references on following page)

UNITED STATES PATENTS

| | | | |
|---|---|---|---|
| 2,424,516 | 7/1947 | St. Pierre | 66—179 |
| 2,642,732 | 6/1953 | Thurston | 66—179 |
| 2,861,441 | 11/1958 | Green et al. | 66—43 |
| 2,932,959 | 4/1960 | Getaz | 66—48 |
| 2,934,921 | 5/1960 | Green | 66—43 |

| | | | |
|---|---|---|---|
| 2,959,946 | 11/1960 | Levin | 66—43 |
| 3,096,633 | 7/1963 | Levin | 66—179 X |

FOREIGN PATENTS

| | | |
|---|---|---|
| 265,513 | 10/1913 | Germany. |
| 454,962 | 1/1928 | Germany. |

RUSSELL C. MADER, *Primary Examiner.*